Dec. 27, 1955     J. J. GREVICH     2,728,543
FISHING ROD HOLDER
Filed June 15, 1950
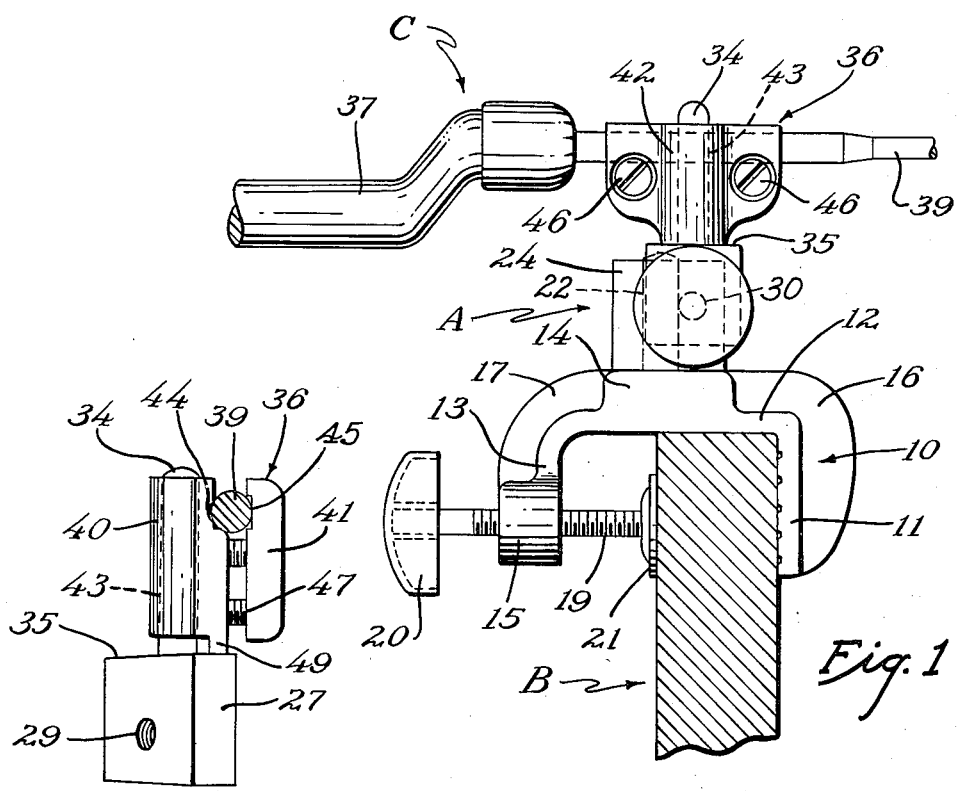
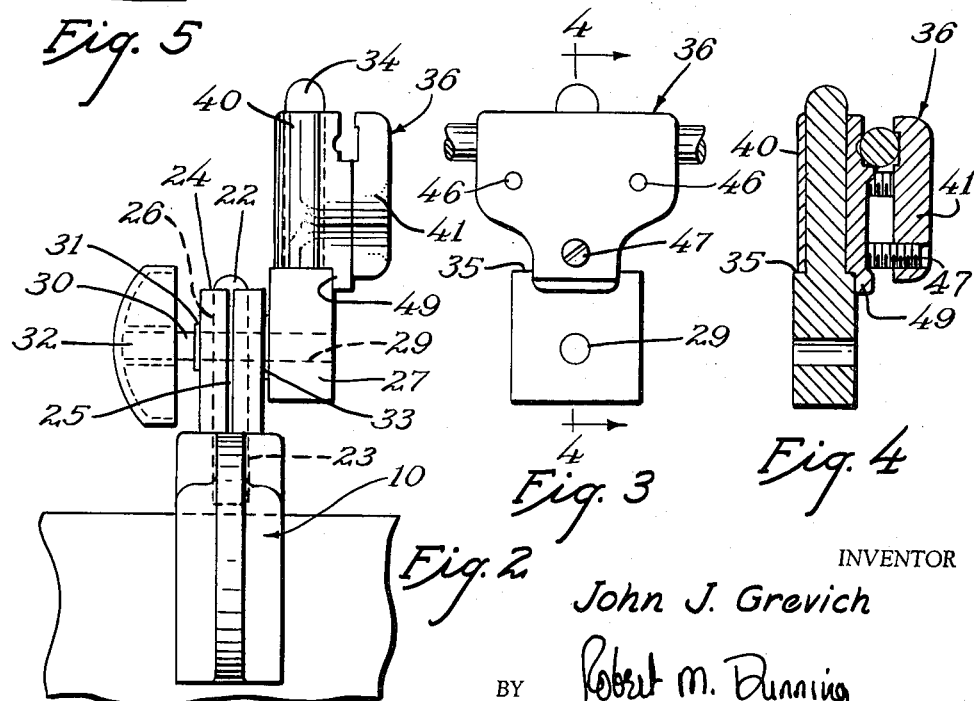
INVENTOR
John J. Grevich
BY Robert M. Dunning
ATTORNEY

United States Patent Office 2,728,543
Patented Dec. 27, 1955

2,728,543

FISHING ROD HOLDER

John J. Grevich, New Richmond, Wis.

Application June 15, 1950, Serial No. 168,200

5 Claims. (Cl. 248—41)

My invention relates to an improvement in fishing rod holder wherein it is desired to provide a simple and effective means of supporting a fishing pole.

Some difficulty is experienced in simultaneously handling a boat and holding a fish pole. As the operation of rowing a boat ordinarily requires the use of both hands, it is hard for a single person in a boat to fish. Even when the boat contains several persons, the person operating the boat usually has difficulty in fishing. The present device discloses a support to which the fishing pole may be attached and which holds the pole in any adjusted position.

In my previous application, Serial No. 36,501, filed July 1, 1948, for "Fishing Rod Holder," now Patent No. 2,513,475, issued July 4, 1950, I disclosed a device which could be attached to a fishing pole and acts as a support therefor. I have found that in some instances difficulty was experienced in disengaging the rod from the holder. The present device comprises a simplification of my previous device and is designed to overcome the difficulties experienced therewith.

An object of the present invention lies in the provision of a clamp which is adaptable to be secured to the side of a boat, the seat of a boat, or any other similar support. This clamping device supports a pivot pin, the position of which may be adjusted. A suitable attachment is provided on the fishing rod and which is socketed to accommodate this pivot pin. As a result the fishing rod may be attached to the clamp by merely engaging the pivot pin in the socket.

A feature of the present invention lies in the provision of a means for normally holding a fish pole at a desired angularity relative to the clamp. The attachment which is connected to the fishing pole is provided with a lip engageable with a portion of the clamping device to prevent rotation of the fish pole attachment about the axis of the pivot pin. This lip may rest upon a portion of the clamp and ride thereupon during pivotal motion of the fishing rod attachment. However, when the lip reaches one particular angular position the lip drops by gravity, together with the remainder of the attachment so that the lip engages a shoulder on the clamp. As a result the fishing pole is held from further pivotal motion about the pivot pin unless it is raised.

These and other objects and novel features of my invention will be more clearly and fully set forth in the following specification and claims.

In the drawings forming a part of my specification:

Figure 1 is a side elevational view of my fishing pole holding device showing the construction thereof.

Figure 2 is a front elevational view of the same.

Figure 3 is an enlarged elevational view showing portions of the clamp and fishing pole attachment in locked position.

Figure 4 is a sectional view through the structure disclosed in Figure 3, the position of the section being indicated by the line 4—4 of Figure 3.

Figure 5 is an elevation view of a portion of the clamp and attachment in which position the locking lip is riding upon the surface of a portion of the clamp.

The clamping device is indicated in general by the numeral A and is designed for attachment to a row boat or the like, which is indicated in general by the letter B. Only a small portion of the boat B is illustrated as the form of the boat or the construction thereof has nothing to do with the rest of the invention.

The device A includes an inverted U-shaped bracket 10 which includes a vertical jaw 11, a horizontal portion 12 and a vertical jaw 13 in parallel spaced relation to the jaw 11. A circular boss 14 projects upwardly from the horizontal portion 12 and a generally cylindrical boss 15 is provided upon the jaw 13. Reinforcing webs 16 and 17 are provided about the two jaws and the connecting portion 12 so as to reinforce the structure.

A threaded shank 19 is threaded through the boss 15. This shank 19 is provided with an operating knob 20 at its outer extremity. A clamping plate 21 is pivotally attached to the other end of the shank 19. Rotation of the shank 19 by the knob 20 acts to move the clamping plate 21 toward or away from the jaw 11 and thereby to clamp an object therebetween or to disengage such an object.

A pivot pin 22 is anchored in a socket 23 in the boss 14. The pivot pin 22 is preferably anchored to the clamp portion 10 and remains united therewith. An adjustable clamping member 24 is pivotally supported upon the pin 22. This adjustable clamping member 24 comprises a rectangular body having a slit 25 therein extending from one edge thereof to a vertical socket 26 which is designed to accommodate the pivot pin 22 by clamping together the portions of the clamping member 24 on opposite sides of the slot 25. This member may be clamped tightly to the pivot pin 22 and held from rotation thereabout.

A block 27 is provided with a threaded aperture 29 therethrough designed to accommodate the threaded shank 30 of an adjustment member. The adjustment member is provided with a shoulder 31 which engages one side of the clamping member 24. The shank 30 is provided with an operating knob 32 by means of which the shank may be easily rotated. A lock washer 33 is interposed between the block 27 and the clamping member 24. By rotation of the shank 30 in one direction the block 27 may be tightened against one side of the clamping member 24 and this action tends to pull the sides of the clamping member 24 on opposite sides of the slot 25 together. This action tends to clamp the clamping device 24 about the pivot pin 22 and to hold this clamping member in proper angular relation relative to the clamping member 10.

The rectangular block 27 is provided with a pivot pin 34 secured thereto and projecting from a flat surface 35 thereof. The angularity of the block 27 relative to the clamping member 24 is determined by the threaded shank 30, this block 27 remaining in the angular adjustment assumed when the shank 30 is tightened, thus both the vertical adjustment about the vertical shaft 22 and the tilting adjustment about the generally horizontal shank 30 is regulated by tightening the single adjustment nut. This construction described to this point is very similar to that employed in my previous construction previously referred to. An attachment 36 is provided which is designed for attachment with any fishing rod such as the rod C. The fishing rod C is shown as including a handle 37 to which is secured a rod shaft 39. The attachment 36 is clamped to the shaft 39 as will be clearly described in detail. This attachment 36 may remain in place indefinitely upon the shaft 39 as it does not interfere with the use of the fishing rod in any way.

The attachment 36 includes two parts 40 and 41 which are designed to engage on opposite sides of the fishing rod.

The part 40 includes a vertical boss 42 which is provided with an aperture 43 extending therethrough. The aperture 43 is arranged on a plane normal to the axis of the fishing rod 39 and is of proper size to accommodate the pivot pin 34. The pivot pin 34 fits into the aperture 43 loosely enough to permit the two parts to pivot relatively. The part 40 also includes an off-set jaw 44 designed to engage against one side of the fishing rod shaft 39 and including an arcuate or V-shaped groove. The part 36 comprises a clamping plate having a laterally extending groove 45 therethrough designed to engage against the side of the fishing rod shaft opposite that engaged by the member 40. Clamping screws 46 extend through apertures in the part 40 and are threaded into the clamping plate 41 so that the clamping plate may be drawn toward the member 40. A set screw 47 is supported in the clamp-plate 41 near the lower extremity thereof. This clamping screw is designed to abut against the part 40 and to hold the clamping plate evenly spaced from the member 40 throughout its height.

The part 40 is provided with a downwardly projecting lip 49 along the edge of the part 40 nearest the clamping plate 41. The distance between the axis of the socket 43 and the inner surface of the lip 49 is just sufficient to permit the lip 49 to engage against the side of the block 27. Thus when the lip 49 is in the position illustrated in Figures 2 and 4 of the drawings, the lip 49 engages against the side of the rectangular block 27 to prevent pivotal motion of the clamp 36 about the axis of the pivot 34. However, in all other angular positions the lip 49 may ride upon the upper surface of the block 27, allowing relative pivotal movement between the block 27 and the clamp 36.

The advantage of this construction is believed obvious from the foregoing description. The clamp arrangement comprises a substantially universal adjustment so that the pivot 34 may extend in any desired direction. This adjustment may be changed by merely loosening the knob 32 and shank 30. The adjustment is made so that the rod 39 when supported by the attachment 36 on the pin 34 is extending in the desired direction.

When it is desired to mount the fishing rod upon the holding apparatus the pin 34 is merely inserted into the socket 43 and the rod pivoted about the pivot 34 until the lip 49 drops alongside of the rectangular block 27. At this time the rod is held in fixed relation and can not move in any direction except longitudinally of the pivot 34.

When it is desired to remove the fishing rod from the holding device, it is only necessary to raise the fishing rod upwardly so as to disengage the pivot pin 34 from the socket 43. The fish pole is entirely free of the device, with the exception of the small attached portion 36 which remains in place upon the fish pole.

In accordance with the patent statutes, I have described the principles of construction and operation of my fishing rod holder, and while I have endeavored to set forth the best embodiment thereof, I desire to have it understood that obvious changes may be made within the scope of the following claims without departing from the spirit of my invention.

I claim:

1. A fishing rod attachment including in combination a bracket element, a pivot pin extending upwardly from said bracket element, an adjustable clamping member adjustably supported by said pivot pin, a block, a member arranged on a generally horizontal axis extending through said adjustable clamping member and pivotally supporting said block for adjustment about said axis, said block having a flat surface arranged on a plane substantially parallel to the axis of said last named member, a second pivot pin projecting from said flat surface, a fishing rod attachment element attachable to a fishing rod and having a socket therein of proper size fitted over said second pivot pin, said attachment element being axially slidable as well as rotatable upon said second pivot pin, and a downwardly projecting lip on said attachment element engaging said flat surface to permit relative pivotal movement between said block and said attachment element, said lip riding over the edge of said flat surface in one pivotal position of said element to permit the lip and attaching element to drop downwardly, said lip then engaging said block to hold the attaching element from rotation.

2. The structure described in claim 1 and in which said bracket element comprising an inverted U-shaped structure having spaced jaws, and a clamping member supported by one jaw movable toward and away from the other jaw.

3. The structure described in claim 1 and in which the fishing rod attachment element comprises a pair of clamping members, and clamping means connecting said members for drawing said clamping members together.

4. The structure defined in claim 1 and in which said member through said adjustable clamping member comprises a clamping bolt capable of securing to said clamping member.

5. The structure described in claim 1 and in which said member through said adjustable clamping member comprises a clamping bolt capable of securing to said clamping member, and also clamping said clamping member upon said first named pivot pin.

References Cited in the file of this patent

UNITED STATES PATENTS

| Number | Name | Date |
|---|---|---|
| 325,456 | Smith | Sept. 1, 1885 |
| 548,273 | Rouse | Oct. 22, 1895 |
| 565,001 | Horton | Aug. 4, 1896 |
| 632,858 | Waibel | Sept. 12, 1899 |
| 1,013,734 | Boyd | Jan. 2, 1912 |
| 1,096,727 | Knowles | May 12, 1914 |
| 1,222,629 | Hout | Apr. 17, 1917 |
| 1,292,421 | Bickel | Jan. 28, 1919 |
| 1,304,787 | Macneale | May 27, 1919 |
| 2,143,109 | Hadaway | Jan. 10, 1939 |
| 2,483,012 | Koon | Sept. 23, 1949 |
| 2,484,427 | Schwenk | Oct. 11, 1949 |
| 2,502,272 | Patton | Mar. 28, 1950 |
| 2,522,255 | Climo | Sept. 12, 1950 |